Nov. 16, 1965  A. S. JENSEN ETAL  3,218,196
RADIANT ENERGY CONVERTER
Filed Feb. 9, 1962

WITNESSES
John E. Heasley, Jr.
Arnold E. Renner

INVENTORS
Arthur S. Jensen &
Igor Limansky
BY
Charles V. Renz
ATTORNEY

United States Patent Office 3,218,196
Patented Nov. 16, 1965

3,218,196
RADIANT ENERGY CONVERTER
Arthur S. Jensen and Igor Limansky, Baltimore, Md., assignors to Westinghouse Electric Corporation, East Pittsburgh, Pa., a corporation of Pennsylvania
Filed Feb. 9, 1962, Ser. No. 172,349
9 Claims. (Cl. 136—89)

This invention relates generally to transducers for the conversion of light to electrical energy and, more particularly, to such devices which enable the generation of power on a relatively large scale from solar energy by the photoemission of electrons.

While in the instant application the terms "light" and "radiation" may be frequently used, it is intended in all instances that, unless otherwise specified, such expressions include visible and invisible portions of the electromagnetic spectrum.

It has long been recognized that enormous amounts of energy are contained in naturally available radiation, the principal source of which is, of course, the sun. Prior art devices for the conversion of solar radiation to electrical energy have primarily been limited to two areas. The first of these areas is that of photovoltaic conversion in which a body of material usually a semiconductor, is bombarded by radiation to form charge carriers which appear as a current in an external circuit. The second of these areas has been in the field of photoelectric tubes such as those discussed in chapter 19 of "Vacuum Tubes" by K. R. Spangenberg, McGraw-Hill, 1948. Phototubes of this nature require a large spacing between photocathode and the anode because fabrication of the cathode by evaporation techniques requires space for the evaporators, appropriate geometry for evaporation, and shielding of the anode. The necessary requirement of having a large cathode also contributes to a larger spacing between the anode and cathode than is desirable in a power device. The large spacing between the cathode and anode results in space charge limits on the current density. Also, the internal resistance of such a device varies directly as the square of the spacing.

While devices of the photovoltaic and photoelectric tube types have found broad usage in such applications as door openers, counters, and automatic light switches, these devices are unsatisfactory as power generators because of their internal resistance and extremely low power output. They are usually found to be power consumers rather than power generators.

The need for photoemissive power generation means is apparent upon consideration of the requirements of space travel, stations on the moon, and orbiting man-made satellites. Under such circumstances, the availability of electrical energy will probably be essential.

In U.S. Patent 3,121,648 entitled "Radiant Energy Converter" by A. S. Jensen, filed April 29, 1960, and assigned to the assignee of the present invention, there is shown and described an electrical power generator for the conversion of radiant energy to electrical energy which is capable of producing usable amounts of power, has a low weight to power generation ratio and which may be made in large sheets. The present invention is of the same general nature as that of the above cited copending patent and is likewise designed to provide a low weight per unit of power derived and which may be made in a large area sheet.

It is, therefore, an object of this invention to provide an improved power generator.

Another object is to provide an improved radiation responsive power generator of useful amounts of electrical energy.

A further object is to provide an improved radiation responsive power generator which may be fabricated in a large area sheet at low cost.

A still further object is to provide an improved radiation responsive power generator having low weight per unit of power derived therefrom.

Another object is to provide a radiation responsive power generator of improved efficiency.

Another object is to provide a radiation responsive power generator, the efficiency of which is improved by the more complete utilization of incident radiation.

A still further object is to provide a photoemissive power generator in which the incident radiation is caused to pass through the photocathode more than one time.

Stated briefly, the present invention provides a radiation responsive power generator which is provided with at least one and preferably a plurality of cathode members which are very closely spaced to the anode. The cathodes emit electrons in response to radiation incident thereon and are, therefore, "photoemissive." In addition, however, the cathode members may be of such a nature that effects in addition to purely photoelectric emission occur, such as thermionic effect, for example. The cathodes in the present invention are partially transmissive to the incident radiation and means are provided whereby the incident radiation, after it has passed through all of the cathodes in one direction, is returned back through the cathodes in the opposite direction resulting in a second utilization of the incident radiation to cause electron emission. The present invention also includes an anode which is substantially shaded from incident radiation so that the anode does not emit electrons in response to the incident radiation.

Further objects and advantages of the invention will become apparent as the following description proceeds and features of novelty which characterize the invention will be pointed out in particularity in the claims next to and forming a part of this specification.

For a better understanding of the invention, reference may be had to the accompanying drawings, in which.

Figure 1:
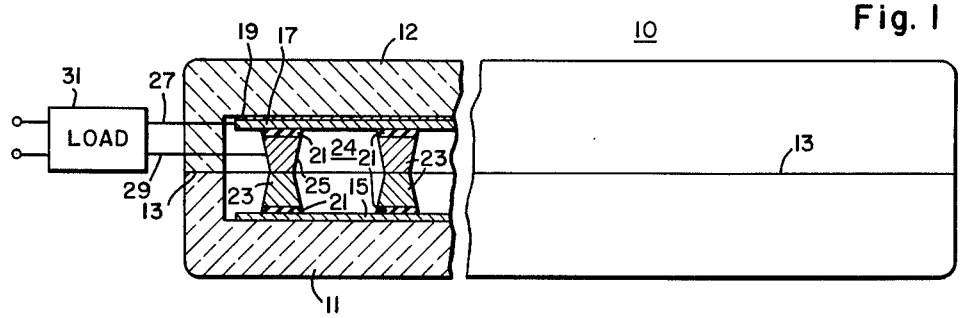
FIGURE 1 is a sectional view, partially broken away and partially in section, of a photoemissive power generator embodying the present invention.
Figure 2:
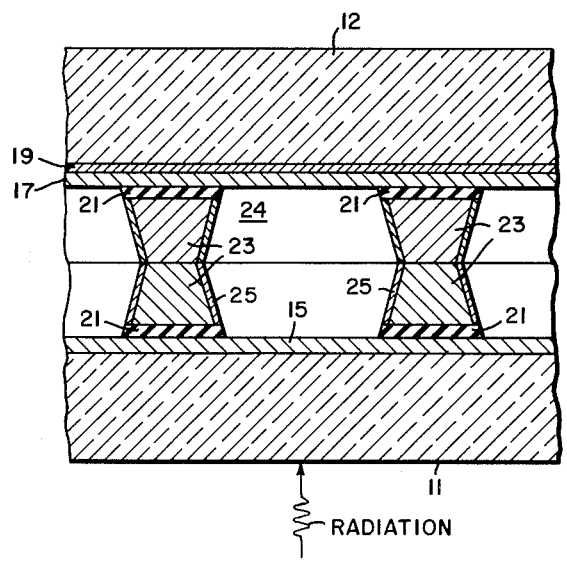
FIG. 2 is an enlarged fragmentary view in section of a portion of the device of FIG. 1.

Referring now to FIGS. 1 and 2, there is shown an evacuated envelope 10 of a radiation transmissive material such as glass or plastic. The envelope 10 has lateral dimensions which are preferably many times greater than those through the device and comprises two large faces 11 and 12 which are joined by a hermetic seal at their periphery 13. A first cathode member 15 is disposed within the envelope 10 on the inner surface of the envelope face 11. The cathode 15 is a layer of suitable photoemissive material, preferably having a low work function, a high quantum efficiency, and a wide spectral response. A suitable material for this purpose is cesium antimonide. However, other materials such as cesium bismuthide and cesium-sodium-potassium antimonide may be employed. The photoemissive material could also be spaced from the envelope face 11 if desirable for a particular structure, but since another structural member would ordinarily be required for this purpose, it is generally more convenient to deposit the cathode 15 directly on the envelope face 11. The photoemissive cathode 15 may be of any material, mixture or structure which has the property of emitting electrons in response to incident radiation. Therefore, the term "photoemissive" as used herein and in the appended claims broadly includes any emission in response to radiation. For example, in addition to photoelectric electron emitter as described in the particular embodiments herein, the cathode 15 may be such that upon bombardment by infrared radiation which is converted to heat, it produces what is ordinarily called "thermionic emission."

A reflecting layer 19 is disposed upon the second inner envelope face 12. While the layer 19 need not be in contact with the surface of the envelope face 12, as in the case of the photocathode 15 to do otherwise would necessitate an additional structure. The layer 19 is of any suitable material which will reflect incident radiation such as highly polished aluminum or nickel. A second cathode 17 is disposed upon the reflecting layer 19. This cathode 17 is of a photoemissive material such as that of the cathode 15 and the two cathodes 15 and 17 are electrically joined.

An anode 24 is positioned intermediate the cathodes 15 and 17. Anode 24 comprises a plurality of interconnected electrically conductive members 23 which may be in the form of a grid or other suitable configuration. In the preferred embodiment each segment of the anode 24 comprises two members 23 of substantially trapezoidal cross section having their small ends connecting one to another and their large ends disposed close to the cathodes 15 and 17. Insulating members 21 serve to insulate the conducting members 23 from the cathodes 15 and 17. The insulating members 21 are of suitable material such as magnesium fluoride or silicon monoxide and may be deposited on the cathodes 15 and 17 by evaporation in a vacuum. The anode 24 also includes layers 25 of low quantum efficiency, low work function material such as silver-oxygen-cesium (known to the art as an S–1 photosurface) which is disposed upon the sides of the conducting members 23.

Radiation incident upon the device is transmitted through the envelope 10 and impinges upon the cathodes 15 and 17. The cathodes 15 and 17 emit electrons on the vacuum side in response to this radiation. The electrons traverse either linear or non-linear paths by which they reach the low work function surfaces 25 of the anode 24. These electrons, having an initial kinetic energy derived from the incident radiant energy, cause the surfaces 25 to charge to a negative potential with respect to the cathode, and it is this difference in potential which makes the device a suitable source of power. Power may be derived from the device by connecting two leads 27 and 29 respectively to the cathode members and the anode members. The conducting leads 27 and 29 are connected to a load impedance which preferably, for maximum transfer of power, equals that of the internal impedance of the device. Usable power may then be derived from the load impedance 31. In this manner, the device is capable of continuous operation because electrons collected by the anode 24 are passed through the load 31 in the external circuit and subsequently return to the cathodes 15 and 17.

The device as shown provides an anode structure which is shaded from radiation which is substantially normal to the plane of the cathodes. This shading is desirable to prevent electron emission from the anode with the resulting tendency to create a reverse current flow within the device. It is readily apparent that the trapezoidal configuration such as has been shown is not the only way of achieving this shading and that the anode 24 may take on such configurations as a double concave surface or it could conceivably even be two planar surfaces which are shaded from incident radiation by the insulating members 21 extending beyond the anode structure 24 and perpendicular thereto.

Figure 3:
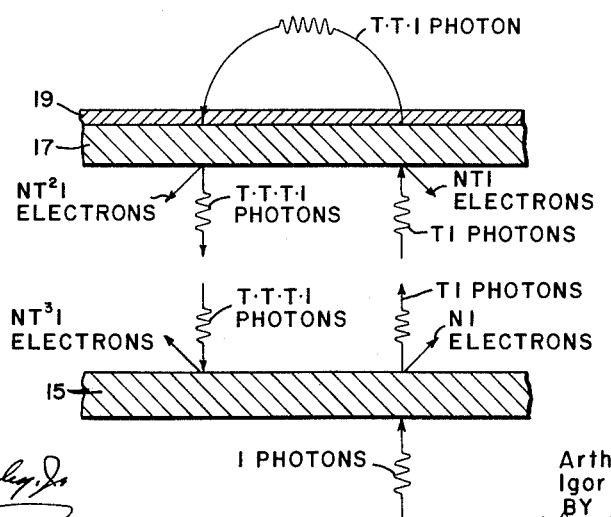
FIG. 3 is a schematic representation of the cathode structure of FIG. 1 which is helpful in the understanding of the present invention.

The operation of the device and the manner in which the efficiency is enhanced by the present invention is best explained with reference to FIG. 3. For the sake of simplicity, in this figure only the two photoemissive cathodes 15 and 17 and the reflecting layer 19 have been shown. For the purpose of this illustration, assume that the quantum efficiency of each of the cathodes 15 and 17 is represented by N and that each time the beam of photons passes through a photosensitive cathode, it is attenuated by a factor T. The number of photoelectrons released upon the impingement of radiation is, therefore, equal to the product of the quantum efficiency (N) of the photocathode and the number of photons striking the photo surface. Assuming I photons are incident upon the lower surface of the cathode 15, it is evident that NI electrons are emitted from the back or vacuum side of the cathode while TI photons are transmitted through the cathode 15 to the lower side of the cathode 17. With TI photons incident upon the lower surface of cathode 17, NTI electrons are emitted from that surface and TTI photons are passed through the cathode 17. These photons (TTI) are reflected by the reflecting layer 19 and returned through the cathode 17 in a direction opposite to that of first transmission. This second transmission through cathode 17 causes $NT^2I$ electrons to be emitted at its lower surface with TTTI photons now being incident upon the upper surface of cathode 15. When the latter amount of radiation strikes the upper surface of cathode 15, $NT^3I$ electrons are emitted. From these figures, it is evident that the total number if photoelectrons released by the incident radiation of I photons which is subsequently reflected is $(NI+NTI+NT^2I+NT^3I)$. If the effective quantum efficiency ($N_{eff}$) is defined as:

$$N_{eff} = \frac{\text{Number of photoelectrons released}}{\text{Number of photons incident}}$$

then:

$$N_{eff} = \frac{NI(1+T+T^2+T^3)}{I} = N(1+T+T^2+T^3)$$

The quantity $1+T+T^2+T^3$ is herein defined as the "improvement factor."

In order to analyze the device more fully, assume the cathode members 15 and 17 are of cesium-antimonide (or S6—O—$C_s$, or antimony-oxygen-cesium) which has a quantum efficiency of about 20 percent and further that the cathodes 15 and 17 are of a thickness corresponding to a white light transmission of about 40 percent (approximately $5.5\mu$ g./cm.$^2$). Substituting these figures into the above equation, it is evident that:

$$N_{eff} = .20(1+0.40+0.16+0.06) = 32\%$$

as compared to 20 percent effective efficiency for a single cathode, single transmission device.

The improvement factor for the above device is equal to:

$$1+0.40+0.16+0.06 = 1.62$$

This factor shows that if the actual efficiency of conversion of light to electrical energy in a photoemissive solar power converter is 1.2 percent for the one-surface photogenerator, a rough approximation (namely, that the conversion efficiency is proprotional to the effective quantum efficiency) would give a conversion efficiency of about 2.0 percent for the two-surface photogenerator of the present invention in which the radiation is reflected back through each of two photocathodes. This corresponds to an efficiency of approximately 162 percent of that of a one-sided device. Thus, it is readily apparent that a device made in accordance with the present invention provides for a greatly improved solar radiation generating means.

In addition to improved efficiency, the present invention possesses a further advantage in space use which is not readily apparent. As power generators in accordance with the present invention can be made in large flexible sheets, a series of these sheets can be interconnected and formed into a balloon so that orientation as to radiation source is not a problem. The interior of such a balloon would be utilized as a container for various forms of electrical equipment and circuitry. By the utilization of the present invention in which the radiation is reflected back in the direction from which it came, it would not be necessary to provide additional shielding to protect this equipment and circuitry from incident radiation of frequencies in which the power generator is designed to operate.

While there have been shown and described what is at present considered to be the preferred embodiment of the invention, modifications thereto will readily occur to those skilled in the art.

For example, it would be possible to provide additional photocathode and anode structures intermediate the photocathode through which the radiation first passes and that associated with the reflecting layer to provide some additional utilization of incident radiation.

It is not desired, therefore, that the invention be limited to the specific arrangement shown and described and it is intended to cover in the apended claims all such modifications as fall within the true spirit and scope of the invention.

We claim as our invention:

1. A power generator comprising an electron emissive cathode responsive to incident radiation, said cathode being transmissive to a portion of said radiation, reflecting means positioned to reflect the transmitted portion of said radiation back through said cathode, and anode means positioned between said cathode and said reflecting means for the collection of electrons emitted from said cathode.

2. A power generator comprising an electron emissive cathode responsive to incident radiation, said cathode being transmissive to a portion of said radiation, means for returning the transmitted portion of said radiation through said cathode, anode means positioned between said cathode and said means for returning the transmitted radiation portion for collecting electrons emitted from said cathode, and means for preventing said radiation from striking said anode.

3. A power generator comprising a radiation responsive cathode for the emission of electrons, said cathode being transmissive to a portion of radiation incident upon it, means for returning the transmitted portion of said radiation through said cathode, anode means for collecting electrons emitted from said cathode and means including the geometry of said anode for preventing said radiation from striking said anode.

4. A power generator comprising first and second electron emissive cathodes responsive to incident radiation, said second cathode disposed in a spaced relationship with respect to said first cathode, each of said cathodes being partially transmissive to said radiation, means disposed adjacent said second cathode to reflect said incident radiation back through said cathodes, and anode means disposed between said cathodes for collecting electrons emitted by said cathodes.

5. A power generator comprising first and second electron emissive cathodes responsive to incident radiation, said second cathode disposed in a space relationship with respect to said first cathode, each of said cathodes being partially transmissive to radiation, means disposed on the remote side of said second cathode with respect to said first cathode to reflect said incident radiation back through said cathodes, anode means disposed between said cathodes for collecting electrons emitted by said cathodes, and means for preventing said incident radiation from striking said anode.

6. An electric power generator comprising an evacuated envelope having first and second opposed large area envelope faces, a first radiation responsive cathode for receiving incident radiation and the emission of electrons in response thereto disposed upon the first of said envelope faces, a radiation reflecting layer disposed on the second of said envelope faces, a second radiation responsive cathode disposed upon said reflecting layer, and means disposed between said first and second cathodes for collecting electrons emitted by said cathode.

7. An electric power generator comprising an evacuated envelope having first and second opposed large area envelope faces, a first radiation responsive cathode for receiving incident radiation and the emission of electrons in response thereto disposed upon the first of said envelope faces, a radiation reflecting layer disposed upon the second of said envelope faces, a second radiation responsive cathode disposed upon said reflecting layer, means disposed between said first and second cathodes for collecting electrons emitted by said cathodes, and means for preventing radiation from striking said collecting means.

8. A power generator comprising an evacuated envelope, first and second electron emissive cathodes responsive and exposed to incident radiation, said cathodes disposed in a spaced relationship one to the other, said cathodes being transmissive to a portion of incident radiation, means adjacent one of said cathodes for returning that portion of the radiation which has passed through said cathodes back through said cathodes in a direction opposite the direction of said first incidence, and an anode disposed between said cathodes and electrically insulated therefrom, said anode including a layer of low work function material for collecting electrons emitted by said cathodes, said layer being substantially shaded from said incident radiation.

9. An power generator comprising an evacuated envelope transparent to incident radiation of the predetermined frequency range and having opposed large area envelope faces, a first electron emissive, radiation responsive, cathode disposed upon one of said envelope faces, means disposed on the other of said faces for reflecting said incident radiation, a second electron emissive, radiation responsive, cathode disposed upon said reflecting means, and anode means disposed between said cathodes and insulated therefrom by insulator means, said anode means comprising a grid of electrically conducting material and a layer of low work function material disposed upon the surface of said grid for collecting electrons emitted from said cathodes, means including the geometry of said grid and said insulator means for substantiating said low work function layer from said radiation.

References Cited by the Examiner

UNITED STATES PATENTS

| 1,939,531 | 12/1933 | Zworykin | 313—94 |
| 2,676,282 | 4/1954 | Polkosky | 313—104 |
| 3,026,439 | 3/1962 | Geer | 313—100 |

ORIS L. RADER, *Primary Examiner.*

DAVID X. SLINEY, *Examiner.*